United States Patent
Kim et al.

(10) Patent No.: US 10,832,869 B2
(45) Date of Patent: *Nov. 10, 2020

(54) MULTILAYER ELECTRONIC COMPONENT

(71) Applicant: SAMSUNG ELECTRO-MECHANICS CO., LTD., Suwon-si (KR)

(72) Inventors: Je Jung Kim, Suwon-si (KR); Do Young Jeong, Suwon-si (KR); Dong Hwi Shin, Suwon-si (KR); Sang Soo Park, Suwon-si (KR); Woo Chul Shin, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/279,070

(22) Filed: Feb. 19, 2019

(65) Prior Publication Data

US 2020/0075257 A1 Mar. 5, 2020

Related U.S. Application Data

(63) Continuation of application No. 16/164,237, filed on Oct. 18, 2018.

(30) Foreign Application Priority Data

Aug. 30, 2018 (KR) .................... 10-2018-0102553

(51) Int. Cl.
*H01G 4/30* (2006.01)
*H01G 4/224* (2006.01)
(Continued)

(52) U.S. Cl.
CPC ............. *H01G 4/30* (2013.01); *H01G 4/0085* (2013.01); *H01G 4/012* (2013.01); *H01G 4/224* (2013.01);
(Continued)

(58) Field of Classification Search
CPC .......... H01G 4/30; H01G 4/228; H01G 4/232
See application file for complete search history.

(56) References Cited

U.S. PATENT DOCUMENTS

| 8,988,850 B1 | 3/2015 | Kodama et al. |
| 2011/0007449 A1 | 1/2011 | Seo et al. |

(Continued)

FOREIGN PATENT DOCUMENTS

| JP | 11162771 A | * 6/1999 | ........... H01G 4/2325 |
| JP | 2000-138130 A | 5/2000 | |

(Continued)

OTHER PUBLICATIONS

Office Action issued in Korean Application No. 10-2018-0102553 dated Jun. 26, 2019, with English translation.

(Continued)

*Primary Examiner* — Eric W Thomas
(74) *Attorney, Agent, or Firm* — Morgan, Lewis & Bockius LLP

(57) ABSTRACT

A multilayer ceramic electronic component includes: a ceramic body including dielectric layers and a plurality of internal electrodes disposed to face each other with each of the dielectric layers interposed therebetween; and external electrodes disposed on external surfaces of the ceramic body and electrically connected to the internal electrodes, respectively, wherein the external electrodes including, respectively, electrode layers electrically connected to the internal electrodes, respectively, and conductive resin layers disposed on the electrode layers, respectively.

12 Claims, 3 Drawing Sheets

(51) Int. Cl.
  *H01G 4/012* (2006.01)
  *H01G 4/008* (2006.01)
  *H01G 4/232* (2006.01)
  *H01G 4/12* (2006.01)

(52) U.S. Cl.
  CPC ......... *H01G 4/2325* (2013.01); *H01G 4/1227* (2013.01)

(56) References Cited

U.S. PATENT DOCUMENTS

| | | |
|---|---|---|
| 2013/0242457 A1 | 9/2013 | Lee et al. |
| 2013/0342956 A1 | 12/2013 | Konishi et al. |
| 2014/0153156 A1* | 6/2014 | Park .................. H01G 4/30 361/303 |
| 2015/0213955 A1* | 7/2015 | Lee .................... H01G 4/30 174/258 |
| 2016/0379758 A1 | 12/2016 | Otani |
| 2019/0148070 A1* | 5/2019 | Kobayashi ........... H05K 1/111 174/260 |

FOREIGN PATENT DOCUMENTS

| | | | |
|---|---|---|---|
| JP | 2008071926 A * | 3/2008 | ........... H01G 4/2325 |
| JP | 2011-018874 A | 1/2011 | |
| JP | 2014-007187 A | 1/2014 | |
| JP | 2014-220324 A | 11/2014 | |
| KR | 10-2013-0104360 A | 9/2013 | |
| KR | 10-2015-0048045 A | 5/2015 | |

OTHER PUBLICATIONS

Office Action issued in corresponding U.S. Appl. No. 16/164,237 dated Dec. 2, 2019.

Office Action issued in Korean Patent Application No. 10-2018-0102553 dated Feb. 11, 2020 (with English Translation).

Final Office Action dated May 15, 2020 in U.S. Appl. No. 16/164,237.

* cited by examiner

MULTILAYER ELECTRONIC COMPONENT

CROSS-REFERENCE OF RELATED APPLICATIONS

This application is a continuation of U.S. patent application Ser. No. 16/164,237, filed on Oct. 18, 2018, which claims the benefit of priority to Korean Patent Application No. 10-2018-0102553 filed on Aug. 30, 2018 in the Korean Intellectual Property Office, the disclosure of which is incorporated herein by reference in their entireties.

TECHNICAL FIELD

The present disclosure relates to a multilayer ceramic electronic component, and more particularly, to a multilayer ceramic electronic component having excellent reliability.

BACKGROUND

Recently, in accordance with the miniaturization, slimness, and multifunctionalization of electronic products, the miniaturization of multilayer ceramic capacitors has also been required, and multilayer ceramic capacitors have also been mounted with a high degree of integration.

A multilayer ceramic capacitor, an electronic component, is mounted on the printed circuit boards of various electronic products such as an image display device including a liquid crystal display (LCD), a plasma display panel (PDP), and the like, a computer, a personal digital assistant (PDA), a cellular phone, or the like, to serve to charge or discharge electricity therein or therefrom.

The multilayer ceramic capacitor may be used as a component of various electronic apparatuses, since it has a small size, implements a high capacitance, and may be easily mounted.

Meanwhile, recently, in accordance with an increase in an interest in electrical components in industry, multilayer ceramic capacitors have also been required to have high reliability and high strength characteristics in order to be used in a vehicle or in an infotainment system.

Particularly, high warpage strength characteristics for multilayer layer capacitors have been recruited, such that there is a need to improve internal and external structures in order to improve warpage characteristics.

SUMMARY

An aspect of the present disclosure may provide a multilayer ceramic electronic component having excellent reliability.

According to an aspect of the present disclosure, a multilayer ceramic electronic component may include: a ceramic body having first and second surfaces opposing each other in a first direction, third and fourth surfaces connected to the first and second, surfaces and opposing each other in a second direction, and fifth and sixth surfaces connected to the first to fourth surfaces and opposing each other in a third direction, and including dielectric layers and a plurality of internal electrodes disposed to face each other with each of the dielectric layers interposed therebetween; and external electrodes disposed on external surfaces of the ceramic body and electrically connected to the internal electrodes, respectively, wherein the ceramic body includes an active portion in which capacitance is formed by including the plurality of internal electrodes disposed to face each other with each of the dielectric layers interposed therebetween and cover portions formed on upper and lower surfaces of the active portion, respectively, the external electrodes including, respectively, electrode layers electrically connected to the internal electrodes, respectively, and conductive resin layers disposed on the electrode layers, respectively, the conductive resin layers extending onto the first and second surfaces of the ceramic body, and a ratio of a thickness of each of the cover portions to a distance from one end portion of each of the conductive resin layers to the other end portion of each of the conductive resin layers disposed on the first and second surfaces of the ceramic body is 20 to 60%.

According to another aspect of the present disclosure, a multilayer ceramic electronic component may include: a ceramic body having first and second surfaces opposing each other in a first direction, third and fourth surfaces connected to the first and second surfaces and opposing each other in a second direction, and fifth and sixth surfaces connected to the first to fourth surfaces and opposing each other in a third direction, and including dielectric layers and a plurality of internal electrodes disposed to face each other with each of the dielectric layers interposed therebetween; and external electrodes disposed on external surfaces of the ceramic body and electrically connected to the internal electrodes, respectively, wherein the ceramic body includes an active portion in which capacitance is formed by including the plurality of internal electrodes disposed to face each other with each of the dielectric layers interposed therebetween and cover portions formed on upper and lower surfaces of the active portion, respectively, the external electrodes including, respectively, electrode layers electrically connected to the internal electrodes, respectively, and conductive resin layers disposed on the electrode layers, respectively, the conductive resin layers extending onto the first and second surfaces of the ceramic body, and a ratio of a distance from one end portion of each of the conductive resin layers to the other end portion of each of the conductive resift layers disposed on the first and second surfaces of the ceramic body to a length of the ceramic body is 20 to 35%.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
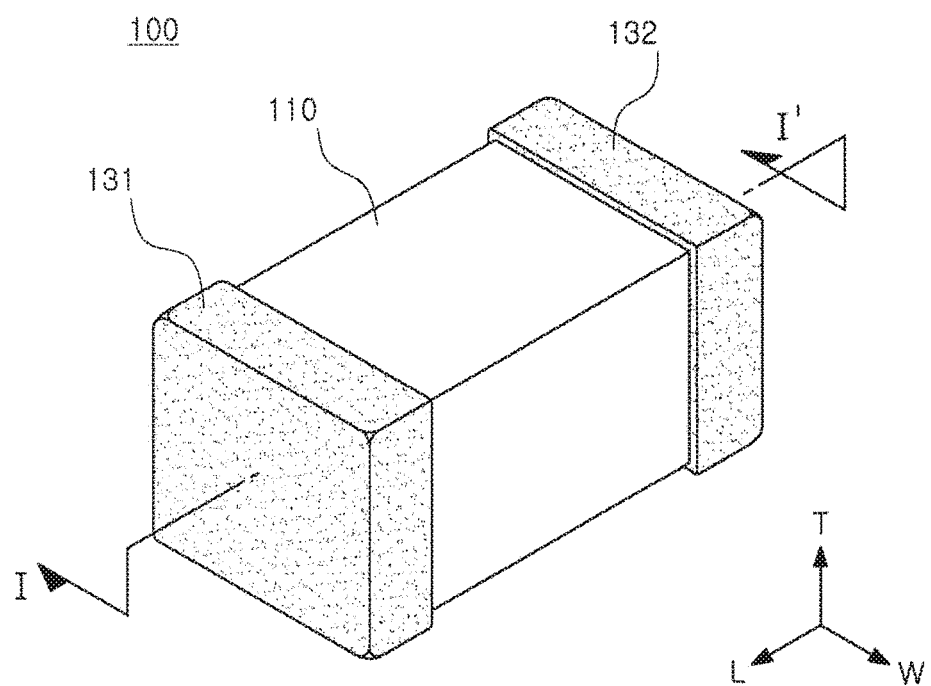
FIG. 1 is a perspective view illustrating a multilayer ceramic capacitor according to an exemplary embodiment in the present disclosure.

FIG. 1 is a perspective view illustrating a multilayer ceramic capacitor according to an exemplary embodiment in the present disclosure.

Figure 2:
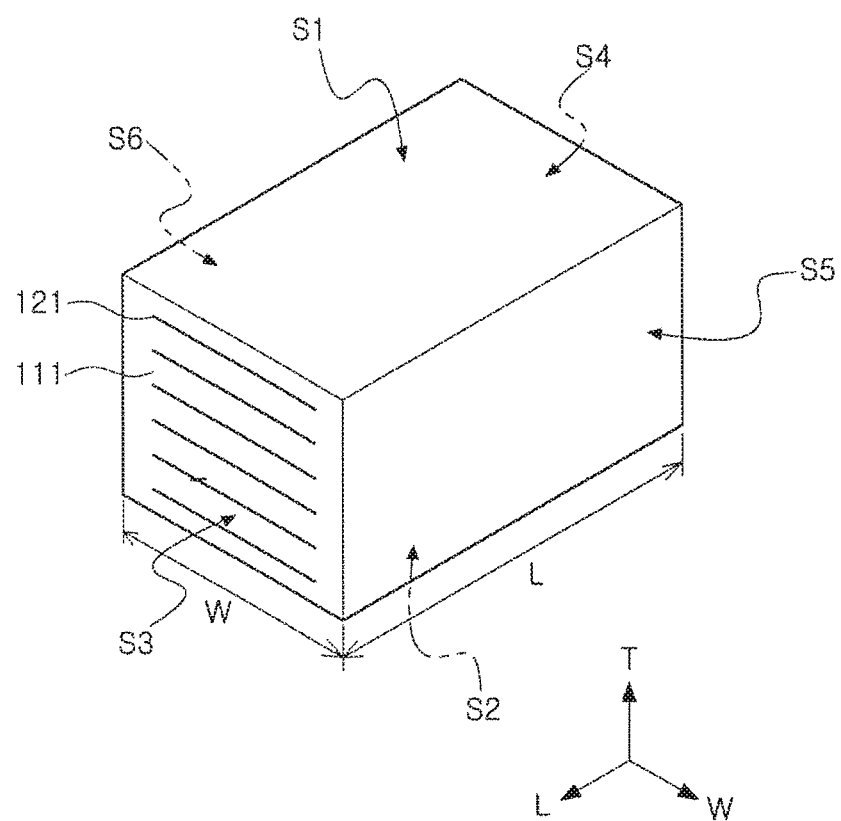
FIG. 2 is a schematic view illustrating a ceramic body according to an exemplary embodiment in the present disclosure.

FIG. 2 is a schematic view illustrating a ceramic body according to an exemplary embodiment in the present disclosure.

Figure 3:
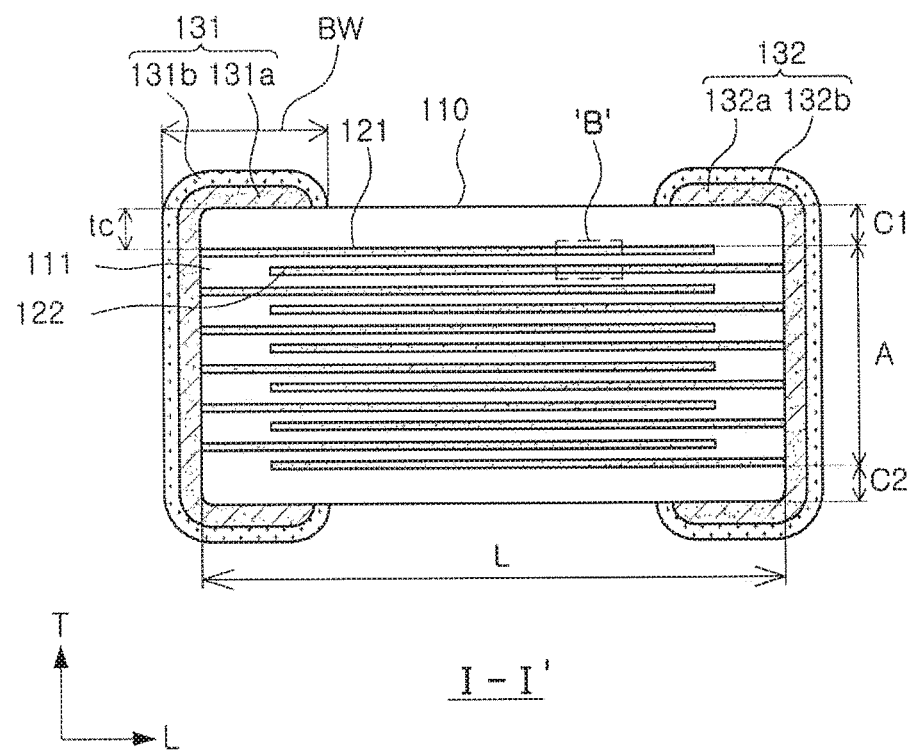
FIG. 3 is a cross-sectional view taken along line I-I' of FIG. 1.

FIG. 3 is a cross-sectional view taken along line I-I' of FIG. 1.

Referring to FIGS. 1 through 3, a multilayer ceramic electronic component 100 according to an exemplary embodiment in the present disclosure may include a ceramic body 110 including dielectric layers 111 and a plurality of internal electrodes 121 and 122 disposed to face each other with each of the dielectric layers 111 interposed therebetween and having first and second surfaces S1 and S2 opposing each other in a first direction, third and fourth surfaces S3 and S4 connected to the first and second surfaces S1 and S2 and opposing each other in a second direction, and fifth and sixth surfaces S5 and S6 connected to the first to fourth surfaces and opposing each other in a third direction, and external electrodes 131 and 132 disposed on external surfaces of the ceramic body 110 and electrically connected to the plurality of internal electrodes 121 and 122, respectively, wherein the ceramic body 110 includes an active portion A in which capacitance is formed by including the plurality of internal electrodes 121 and 122 disposed to face each other with each of the dielectric layers 111 interposed therebetween and cover portions C1 and C2 formed on upper and lower surfaces of the active portion A, respectively.

A multilayer ceramic electronic component according to an exemplary embodiment in the present disclosure, particularly, a multilayer ceramic capacitor will hereinafter be described. However, the multilayer ceramic electronic component according to the present disclosure is not limited thereto.

In the multilayer ceramic capacitor according to an exemplary embodiment in the present disclosure, a 'length direction' refers to an 'L' direction of FIG. 1, a 'width direction' refers to a 'W' direction of FIG. 1, and a 'thickness direction' refers to a 'T', direction of FIG. 1. Here, the 'thickness direction' refers to a direction in which the dielectric layers 111 are stacked, that is, a 'stack direction'.

In an exemplary embodiment in the present disclosure, a shape of the ceramic body 110 is not particularly limited, and may be a hexahedral shape as illustrated.

The ceramic body 110 may have the first and second surfaces S1 and S2 opposing each other in the first direction, the third and fourth surfaces S3 and S4 connected to the first and second surfaces S1 and S2 and opposing each other in the second direction, and the fifth and sixth surfaces S5 and S6 connected to the first to fourth surfaces and opposing each other in the third direction.

The first and second surfaces S1 and S2 refer to surfaces of the ceramic body 110 opposing each other in the thickness direction, which is the first direction, the third and fourth surfaces S3 and S4 refer to surfaces of the ceramic body 110 opposing each other in the length direction, which is the second direction, and the fifth and sixth surfaces S5 and S6 refer to surfaces of the ceramic body 110 opposing each other in the width direction, which is the third direction.

One ends of the plurality of internal electrodes 121 and 122 formed in the ceramic body 110 may be exposed to the third surface S3 or the fourth surface S4 of the ceramic body 110.

The internal electrodes 121 and 122 may have a pair of first and second internal electrodes 121 and 122 having different polarities.

One ends of the first internal electrodes 121 may be exposed to the third surface S3, and one ends of the second internal electrodes 122 may be exposed to the fourth surface S4.

The other ends of the first internal electrodes 121 and the second internal electrodes 122 may be formed to be spaced apart from the fourth surface 84 the third surface S3 by a predetermined interval. More detailed contents for this will be described below.

First and second external electrodes 131 and 132 may be formed on the third and fourth surfaces S3 and S4 of the ceramic body 110, respectively, and may be electrically connected to the internal electrodes 121 and 122.

According to an exemplary embodiment in the present disclosure, a raw material of the dielectric layer 111 is not particularly limited as long as a sufficient capacitance may be obtained, and may be, for example, barium titanate-based material, a lead composite perovskite-based material, a strontium titanate-based material, or the like.

A material of the dielectric layer 111 may be prepared by adding various ceramic additives, organic solvents, plasticizers, binders, dispersants, and the like, to powders such as barium titanate ($BaTiO_3$) powders, or the like, according to an object of the present disclosure.

The ceramic body 110 may include the active portion A contributing to forming the capacitance of the multilayer ceramic capacitor, and the upper and lower cover portions C1 and C2 formed as upper and lower margin portions on the upper and lower surfaces of the active portion A, respectively.

The active portion A may be formed by repeatedly stacking a plurality of first and second internal electrodes 121 and 122 with each of the dielectric layers 111 interposed therebetween.

The upper and lower cover portions C1 and C2 may be formed of the same material as that of the dielectric layer 111 and have the same configuration as that of the dielectric layer 111 except that they do not include the internal electrodes.

That is, the upper and lower cover portions C1 and C2 may include a ceramic material such as a barium titanate ($BaTiO_3$)-based ceramic material.

The upper and lower cover portions C1 and C2 may be formed by stacking a single dielectric layer or two or more dielectric layers on the upper and lower surfaces of the active portion A, respectively, in a vertical direction, and may basically serve to prevent damage to the internal electrodes due to physical or chemical stress.

A material of each of the first and second internal electrodes 121 and 122 is not particularly limited, but may be a conductive paste including one or more of silver (Ag), lead (Ph), platinum (Pt), nickel (Ni), and copper (Cu).

The multilayer ceramic capacitor according to an exemplary embodiment in the present disclosure may include the first external electrode 131 electrically connected to the first internal electrodes 121 and the second external electrode 132 electrically connected the second internal electrodes 122.

The first and second external electrodes 131 and 132 may be electrically connected to the first and second internal electrodes 121 and 122, respectively, in order to form capacitance, and the second external electrode 132 may be connected to a potential different to a potential to which the first external electrode 131 is connected.

The first and second external electrodes 131 and 132 may be disposed, respectively, on the third and fourth surfaces S3 and S4 of the ceramic body 110 in the length direction, which is the second direction, and may extend to the first and second surfaces S1 and S2 of the ceramic body 110 in the thickness direction, which its the first direction.

The external electrodes 131 and 132 may including, respectively, electrode layers 131a and 132a disposed on the external surfaces of the ceramic body 110 and electrically connected to the internal electrodes 121 and 122, respectively, and conductive resin layers 131b and 132b disposed on the electrode layers 131a and 132a, respectively.

The electrode layers 131a and 132a may include a conductive metal and a glass.

The conductive metal used in the electrode layers 131a and 132a may be any material that may be electrically connected to the internal electrodes in order to form the capacitance, for example, one or more selected from the group consisting of copper, silver (Ag), nickel (Ni), and alloys thereof.

The electrode layers 131a and 132a may be formed by applying and theft sintering a conductive paste prepared by adding glass frit to conductive metal powders.

The conductive resin layers 131b and 132b may be formed on the electrode layers 131a and 132a, respectively, and may be formed to completely cover the electrode layers 131a and 132a, respectively.

A base resin included in each of the conductive resin layers 131b and 132b may have a bonding property and a shock absorbing property, may be any resin that may be mixed with conductive metal powders to form a paste, and may include, for example, an epoxy-based resin.

A conductive metal included in each of the conductive resin layers 131b and 132b may be any material that may be electrically connected to the electrode layers 131a and 132a, and may include, for example, one or more selected from the group consisting of copper (Cu), silver (Ag), nickel (Ni), and alloys thereof.

The conductive resin layers 131b and 132b may extend to the first and second surfaces S1 and S2 of the ceramic body 110, and a ratio of a thickness tc of each of the cover portions C1 and C2 to a distance BW from one end portion of each of the conductive resin layers 131b and 132b to the other end portion of each of the conductive resin layers 131b and 132b disposed on the first and second surfaces S1 and S2 of the ceramic body 110 may be 20 to 60%.

According to an exemplary embodiment in the present disclosure, the ratio of the thickness tc of each of the cover portions C1 and C2 to the distance BW from one end portion of each of the conductive resin layers 131b and 132b to the other end portion of each of the conductive resin layers 131b and 132b disposed on the first and second surfaces S1 and S2 of the ceramic body 110 may be 20 to 60%, such that warpage strength of the multilayer ceramic capacitor may be improved.

When the ratio of the thickness tc of each of the cover portions C1 and C2 to the distance BW from one end portion of each of the conductive resin layers 131b and 132b to the other end portion of each of the conductive resin layers 131b and 132b disposed on the first and second surfaces S1 and S2 of the ceramic body 110 is less than 20%, that is, when the thickness tc of each of the cover portions C1 and C2 is small, a layer crack occurrence frequency due to warpage stress may be increased, such that reliability may be decreased.

When the ratio of the thickness tc of each of the cover portions C1 and C2 to the distance BW from one end portion of each of the conductive resin layers 131b and 132b to the other end portion of each of the conductive resin layers 131b and 132b disposed on the first and second surfaces S1 and S2 of the ceramic body 110 exceeds 60%, that is, when the thickness tc of each of the cover portions C1 and C2 is great, a ceramic fraction may be increased, such that a warpage crack occurrence frequency may be increased.

Meanwhile, according to an exemplary embodiment in the present disclosure, in addition to the feature described above, a ratio of the distance BW from one end portion of each of the conductive resin layers 131b and 132b to the other end portion of each of the conductive resin layers 131b and 132b disposed on the first and second surfaces S1 and S2 of the Ceramic body 110 to a length L of the ceramic body 110 may be 20 to 35%.

According to an exemplary embodiment in the present disclosure, the ratio of the distance BW from one end portion of each of the conductive resin layers 131b and 132b to the other end portion of each of the conductive resin layers 131b and 132b disposed on the first and second surfaces S1 and 82 of the ceramic body 110 to the length L of the ceramic body 110 may be 20 to 35%, such that warpage strength of the multilayer ceramic capacitor may be improved.

When the ratio of the distance BW from one end port of each of the conductive resin layers 131b and 132b to the other end portion of each of the conductive resin layers 131b and 132b disposed on the first and second surfaces S1 and S2 of the ceramic body 110 to the length L of the ceramic body 110 is less than 20%, that is, when BW of each of the conductive resin layer 131b an 132b is small, warpage characteristic may be deteriorated, such that reliability may be decreased.

When the ratio of the distance BW from one end portion of each of the conductive resin layers 131b and 132b to the other end portion of each of the conductive resin layers 131b and 132b disposed on the first and second surfaces S1 and 82 of the ceramic body 110 to the length L of the ceramic body 110 exceeds 35%, that is, when BW of each of the conductive resin layer 131b an 132b is great, a short-circuit may occur due to a migration phenomenon in which a metal of the external electrode is ionized, such that ions migrate from a positive electrode to a negative electrode, moisture, or the like, such that reliability may be decreased.

Figure 4:
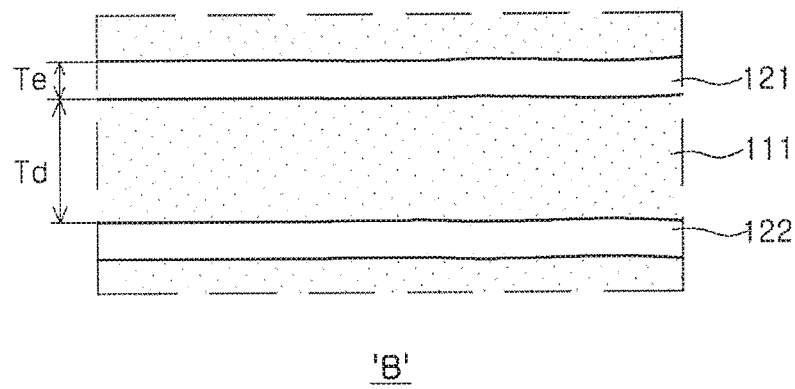
FIG. 4 is an enlarged view of region B of FIG. 3.

FIG. 4 is an enlarged view of region B of FIG. 3.

Referring to FIG. 4, in the multilayer ceramic electronic component according to an exemplary embodiment in the present disclosure, td>2×te in which td is a thickness of the dielectric layer 111 and te is a thickness of each of the internal electrodes 121 and 122.

That is, according an exemplary embodiment in the present disclosure, the thickness td of the dielectric layer 111 may be greater than two times the thickness te of each of the internal electrodes 121 and 122.

Generally, in a high-voltage electrical component, a reliability problem depending on a decrease in a break-down voltage under a high voltage environment may be important.

In the multilayer ceramic capacitor according to an exemplary embodiment in the present disclosure, the thickness td of the dielectric layer 111 may be set to be greater than two times the thickness te of each of the internal electrodes 121 and 122 in order to prevent the decrease in the break-down voltage under the high voltage environment. That is, the thickness of the dielectric layer, which is a distance between the internal electrodes 121 and 122, may be increased to improve break-down voltage characteristics.

When the thickness td of the dielectric layer 111 is equal to or less than two times the thickness te of each of the internal electrodes 121 and 122, the thickness of the dielectric layer, which is the distance between the internal electrodes 121 and 122, may be small, such that the break-down voltage may be decreased.

The thickness te of the internal electrode 121 or 122 may be less than 1 µm, and the thickness td of the dielectric layer may be less than 2.8 µm. However, the thickness te of the internal electrode 121 or 122 and the thickness td of the dielectric layer are not necessarily limited thereto.

A multilayer ceramic electronic component 100 according to another exemplary embodiment in the present disclosure may include a ceramic body 110 including dielectric layers 111 and a plurality of internal electrodes 121 and 122 disposed to face each other with each of the dielectric layers 111 interposed therebetween and having first and second surfaces S1 and S2 opposing each other in a first direction, third and fourth surfaces S3 and S4 connected to the first and second surfaces S1 and S2 and opposing each other in a second direction, and fifth and sixth surfaces S5 and S6 connected to the first to fourth surfaces and opposing each other in a third direction, and external electrodes 131 and 132 disposed on external surfaces of the ceramic body 110 and electrically connected to the plurality of internal electrodes 121 and 122, respectively, wherein the ceramic body 110 includes an active portion A in which capacitance is formed by including the plurality of internal electrodes 121 and 122 disposed to face each other with each of the dielectric layers 111 interposed therebetween and cover portions C1 and C2 formed on upper and lower surfaces of the active portion A, respectively, the external electrodes 131 and 132 including, respectively, electrode layers 131a and 132a electrically connected to the internal electrodes 121 and 122, respectively, and conductive resin layers 131b and 132b disposed on the electrode layers 131a and 132a, respectively, and the conductive resin layers 131b and 132b extend to the first and second surfaces S1 and S2 of the ceramic body 110, and a ratio of a distance BW from one end portion of each of the conductive resin layers 131b and 132b to the other end portion of each of the conductive resin layers 131b and 132b disposed on the first and second surfaces S1 and S2 of the ceramic body 110 to a length L of the ceramic body 110 is 20 to 35%.

A description for features that are the same as those of the multilayer ceramic electronic component according to the exemplary embodiment in the present disclosure described above among features of the multilayer ceramic electronic component according to another exemplary embodiment in the present disclosure will be omitted in order to avoid an overlapping description.

According to another exemplary embodiment in the present disclosure, the ratio of the distance BW from one end portion of each of the conductive resin layers 131b and 132b to the other end portion of each of the conductive resin layers 131b and 132b disposed on the first and second surfaces S1 and S2 of the ceramic body 110 to the length L of the ceramic body 110 may be 20 to 35%.

The ratio of the distance BW from one end portion of each of the conductive resin layers 131b and 132b to the other end portion of each of the conductive resin layers 131b and 132b disposed on the first and second surfaces S1 and S2 of the ceramic body 110 to the length L of the ceramic body 110 may be 20 to 35%, such that warpage strength of the multilayer ceramic capacitor may improved.

When the ratio of the distance BW from one end portion of each of the conductive resin layers 131b and 132b to the other end portion of each of the conductive resin layers 131b and 132b disposed on the first and second surfaces S1 and 82 of the ceramic body 110 to the length L of the ceramic body 110 is less than 20%, that is, when BW of each of the conductive resin layer 131b are 132b is small, warpage characteristic may be deteriorated, such that reliability may be decreased.

When the ratio of the distance BW from one end portion of each of the conductive resin layers 131b and 132b to the other end portion of each of the conductive resin layers 131b and 132b disposed on the first and second surfaces S1 and S2 of the ceramic body 110 to the length L of the ceramic body 110 exceeds 25%, that is, when BW of each of the conductive resin layer 131b an 132b is great, a short-circuit may occur due to a migration phenomenon that a metal of the external electrode is ionized, such that ions moves from a positive electrode to a negative electrode, moisture, or the like, such that reliability may be decreased.

Hereinafter, a method of manufacturing a multilayer ceramic electronic component according to an exemplary embodiment in the present disclosure will be described, but the present disclosure is not limited thereto.

In the method of manufacturing a multilayer ceramic electronic component according to an exemplary embodiment in the present disclosure, slurry including powders such as barium titanate ($BaTiO_3$) powders, or the like, may be first applied onto carrier films and dried to prepare a plurality of ceramic green sheets, resulting in dielectric layers.

The ceramic green sheet may be manufactured by preparing slurry by mixing ceramic powders, a binder, and a solvent with one another and manufacturing the slurry in a sheet shape having a thickness of several micrometers by a doctor blade method.

Next, a conductive paste for an internal electrode including 40 to 50 parts by weight of nickel powders having an average particle size of 0.1 to 0.2 µm may be prepared.

The conductive paste for an internal electrode was applied onto the ceramic green sheets by a screen printing method to form the internal electrodes, and the ceramic green sheets on which internal electrode patterns are disposed were stacked to form the ceramic body 110.

Then, electrode layers including one or more conductive metals selected from the group consisting of copper (Cu), silver (Ag), nickel (Ni), and alloys thereof, and a glass may be formed on external surfaces of the ceramic body 110.

The glass is not particularly limited, but may be a material having the same composition as that of a glass used to manufacture an external electrode of a general multilayer ceramic capacitor.

The electrode layers may be formed on upper and lower surfaces and end portions of the ceramic body 110 to be electrically connected to the first and second internal electrodes 121 and 122, respectively.

The electrode layer may include 5% by volume or more of glass relative to the conductive metal.

Then, the conductive resin layers 131b and 132b may be formed by applying a conductive resin composition to the electrode layers 131a and 132a and then hardening the conductive resin composition.

The conductive resin layer 131b and 132b, may include one or more conductive metals selected from the group consisting of copper (Cu), silver (Ag), nickel (Ni), and alloys there and a base resin. The base resin may be an epoxy resin.

According to an exemplary embodiment in the present disclosure, the conductive resin layers may extend to the first and second surfaces of the ceramic body 110, and a ratio of a thickness tc of each of the cover portions to a distance BW from one end portion of each of the conductive resin layers to the other end portion of each of the conductive resin layers disposed on the first and second surfaces of the ceramic body 110 may be 20 to 60%.

In addition, a ratio of the distance BW from one end portion of each of the conductive resin layers to the other end portion of each of the conductive resin layers disposed on the first and second surfaces of the ceramic body 110 to the length of the ceramic body 110 may be 20 to 35%.

The following Table 1 illustrates measurement results of a warpage crack occurrence frequency depending on a ratio of a thickness tc of each of the cover portions to a distance BW from one end portion of each of the conductive resin layers to the other end portion of each of the conductive resin layers disposed on the first and second surfaces of the ceramic body 110.

In measuring the warpage crack occurrence frequency, in a state in which samples of multilayer ceramic capacitors are mounted on a board and distances from central portions pressed at the time of bending the samples of the multilayer ceramic capacitors are then set to 3 mm, 4 mm, and 5 mm, respectively, the warpage crack occurrence frequency was measured for sixty specimens of each sample, and it was observed whether or not warpage strength is ensured at the distance of 5 mm.

TABLE 1

| Sample No. | tc/BW | 3 mm | 4 mm | 5 mm |
|---|---|---|---|---|
| *1 | 10.0% | 3/60 | 4/60 | 10/60 |
| *2 | 15.0% | 0/60 | 2/60 | 4/60 |
| 3 | 20.0% | 0/60 | 0/60 | 0/60 |
| 4 | 30.0% | 0/60 | 0/60 | 0/60 |
| 5 | 40.0% | 0/60 | 0/60 | 0/60 |
| 6 | 60.0% | 0/60 | 0/60 | 0/60 |
| *7 | 80.0% | 0/60 | 0/60 | 2/60 |

*Comparative Example

It may be seen from Table 1 that in only Samples 3 to 6 in which a ratio of a thickness to of each of the cover portions to a distance BW from one end portion of each of the conductive resin layers to the other end portion of each of the conductive resin layers disposed on the first and second surfaces of the ceramic body 110 is 20 to 60% according to an exemplary embodiment in the present disclosure, warpage strength characteristics are satisfied at a distance up to 5 mm.

The following Table 2 illustrates measurement results of a warpage crack occurrence frequency depending on a ratio of a distance BW from one end portion of each of the conductive resin layers to the other end portion of each of the conductive resin layers disposed on the first and second surfaces of the ceramic body 110 to a length L of the ceramic body 110.

In measuring the warpage crack occurrence frequency, in a state in which samples of multilayer ceramic capacitors are mounted on a board and distances from a central portion pressed at the time of performing bending are then set to 3 mm, 4 mm, and 5 mm, respectively, the warpage crack occurrence frequency was measured for sixty specimens of each sample and it was observed whether or not warpage strength is ensured at the distance of 5 mm.

TABLE 2

| Sample No. | BW/L | 3 mm | 4 mm | 5 mm |
|---|---|---|---|---|
| *8 | 15.0% | 0/60 | 2/60 | 4/60 |
| *9 | 17.0% | 0/60 | 0/60 | 1/60 |
| 10 | 20.0% | 0/60 | 0/60 | 0/60 |
| 11 | 25.0% | 0/60 | 0/60 | 0/60 |
| 12 | 30.0% | 0/60 | 0/60 | 0/60 |
| 13 | 35.0% | 0/60 | 0/60 | 0/60 |
| *14 | 40.0% | 0/60 | 0/60 | 0/60 |

*Comparative Example

It may be seen from Table 2 that in only Samples 10 to 13 in which a ratio of a distance BW from one end portion of each of the conductive resin layers to the other end portion of each of the conductive resin layers disposed on the first and second surfaces of the ceramic body 110 to a length L of the ceramic body 110 is 20 to 35% according to an exemplary embodiment in the present disclosure, warpage strength characteristics are satisfied at a distance up to 5 mm.

In Comparative Example 14, warpage strength characteristics are satisfied, but there is a risk of a short-circuit. Therefore, in an exemplary embodiment in the present disclosure, the ratio of the distance BW from one end portion of each of the conductive resin layers to the other end portion of each of the conductive resin layers disposed on the first and second surfaces of the ceramic body 110 to the length L of the ceramic body 110 may be set to 35% or less.

As set forth above, according to an exemplary embodiment in the present disclosure, ratios between the distance of the conductive resin layer included in the external electrode up to an end portion of the conductive resin layer disposed on the first and second surfaces of the ceramic body 110, and the thickness of the cover portion and the length of the ceramic body 110 may be controlled to improve the warpage strength, resulting in improvement of reliability of the multilayer ceramic electronic component.

While exemplary embodiments have been shown and described above, it will be apparent to those skilled in the art that modifications and variations could be made without departing from the scope of the present invention as defined by the appended claims.

What is claimed is:

1. A multilayer ceramic electronic component comprising:
a ceramic body having first and second surfaces opposing each other in a first direction, third and fourth surfaces connected to the first and second surfaces and opposing each other in a second direction, and fifth and sixth surfaces connected to the first to fourth surfaces and opposing each other in a third direction, and including dielectric layers and a plurality of internal electrodes disposed to face each other in the first direction with each of the dielectric layers interposed therebetween; and
multi-layer external electrodes disposed on the third and fourth surfaces of the ceramic body and electrically connected to the internal electrodes, respectively,
wherein the ceramic body includes an active portion in which capacitance is formed by including the plurality of internal electrodes disposed to face each other with each of the dielectric layers interposed therebetween and cover portions disposed on upper and lower surfaces of the active portion in the first direction, respectively,
the multi-layer external electrodes each including an electrode layer electrically connected to the plurality of internal electrodes, respectively, and a conductive resin layer disposed on the electrode layer, each conductive resin layer extending onto and into contact with the first and second surfaces of the ceramic body, and a ratio of a thickness of each of the cover portions in the first direction to a first distance in the second direction from one end of each respective multi-layer external electrode, including the conductive resin layer contacting the first or second surface of the ceramic body, to an opposing outermost surface of the respective multi-layer external electrode in the second direction, ranges from 20 to 60%.

2. The multilayer ceramic electronic component of claim 1, wherein a ratio of the first distance to a length of the ceramic body in the second direction ranges from 20 to 35%.

3. The multilayer ceramic electronic component of claim 1, wherein the electrode layer of each multi-layer external electrode includes one or more conductive metals selected from the group consisting of copper (Cu), silver (Ag), nickel (Ni), and alloys thereof.

4. The multilayer ceramic electronic component of claim 1, wherein the conductive resin layer of each multi-layer external electrode includes one or more conductive metals selected from the group consisting of copper (Cu), silver (Ag), nickel (Ni), and alloys thereof, and a base resin.

5. The multilayer ceramic electronic component of claim 1, wherein a thickness of each internal electrode is less than 1 μm.

6. The multilayer ceramic electronic component of claim 1, wherein a thickness of each dielectric layer is less than 2.8 μm.

7. The multilayer ceramic electronic component of claim 1, wherein td>2×te in which dimension "td" is a thickness of each dielectric layer and dimension "te" is a thickness of each internal electrode.

8. A multilayer ceramic electronic component comprising:
a ceramic body having first and second surfaces opposing each other in a first direction, third and fourth surfaces connected to the first and second surfaces and opposing each other in a second direction, and fifth and sixth surfaces connected to the first to fourth surfaces and opposing each other in a third direction, and including dielectric layers and a plurality of internal electrodes disposed to face each other in the first direction with each of the dielectric layers interposed therebetween, wherein a thickness of each dielectric layer is less than 2.8 μm; and multi-layer external electrodes disposed on the third and fourth surfaces of the ceramic body and electrically connected to the internal electrodes, respectively, wherein the ceramic body includes an active portion in which capacitance is formed by including the plurality of internal electrodes disposed to face each other with each of the dielectric layers interposed therebetween and cover portions disposed on upper and lower surfaces of the active portion in the first direction, respectively, the multi-layer external electrodes each including an electrode layer electrically connected to the plurality of internal electrodes, respectively, and a conductive resin layer disposed on the electrode layer, each conductive resin layer extending onto and into contact with the first and second surfaces of the ceramic body, and a first distance in the second direction from one end of each respective multi-layer external electrode, including the conductive resin layer contacting the first or second surface of the ceramic body, to an opposing outermost surface of the respective multi-layer external electrode in the second direction, is configured such that:

a first ratio of a thickness of each of the cover portions in the first direction to the first distance ranges from 20 to 60%, and a second ratio of the first distance to a length of the ceramic body in the second direction ranges from 20 to 35%.

9. The multilayer ceramic electronic component of claim 8, wherein the electrode layer of each multi-layer external electrode includes one or more conductive metals selected from the group consisting of copper (Cu), silver (Ag), nickel (Ni), and alloys thereof.

10. The multilayer ceramic electronic component of claim 8, wherein the conductive resin layer of each multi-layer external electrode includes one or more conductive metals selected from the group consisting of copper (Cu), silver (Ag), nickel (Ni), and alloys thereof, and a base resin.

11. The multilayer ceramic electronic component of claim 8, wherein a thickness of each internal electrode is less than 1 μm.

12. The multilayer ceramic electronic component of claim 8, wherein td>2×te in which dimension "td" is a thickness of each dielectric layer and dimension "te" is a thickness of each internal electrode.

* * * * *